(12) United States Patent
Zada et al.

(10) Patent No.: US 9,519,513 B2
(45) Date of Patent: Dec. 13, 2016

(54) METHODS AND APPARATUS TO AUTOMATICALLY CONFIGURE MONITORING OF A VIRTUAL MACHINE

(71) Applicant: VMware, Inc., Palo Alto, CA (US)

(72) Inventors: Dan Zada, Jerusalem (IL); Asaf Kariv, Tel Mond (IL); Mayan Weiss, Herzelia (IL); Amir Wiener, Kfar Saba (IL); Ella Rozanov, Herzelia (IL)

(73) Assignee: VMware, Inc., Palo Alto, CA (US)

( * ) Notice: Subject to any disclaimer, the term of this patent is extended or adjusted under 35 U.S.C. 154(b) by 290 days.

(21) Appl. No.: 14/231,018

(22) Filed: Mar. 31, 2014

(65) Prior Publication Data

US 2015/0154039 A1 Jun. 4, 2015

Related U.S. Application Data

(60) Provisional application No. 61/911,375, filed on Dec. 3, 2013.

(51) Int. Cl.
*G06F 9/44* (2006.01)
*G06F 9/455* (2006.01)
(Continued)

(52) U.S. Cl.
CPC ............ *G06F 9/5011* (2013.01); *G06F 8/61* (2013.01); *G06F 9/45558* (2013.01);
(Continued)

(58) Field of Classification Search
CPC ............ G06F 9/45558; G06F 9/5077; G06F 11/3409; G06F 11/3457; G06F 17/5009; G06F 2009/45591; G06F 9/5027; G06F 9/5061; G06F 9/5016; G06F 9/5011; G06F 9/4443; G06F 9/45533; G06F 9/5072; G06F 8/61; G06F 8/65; G06F 8/60; G06F 11/3003; G06F 11/3495; G06F 11/3664

See application file for complete search history.

(56) References Cited

U.S. PATENT DOCUMENTS 6,708,215 B1 3/2004 Hingorani et al.
7,082,464 B2 7/2006 Hasan et al.
(Continued)

FOREIGN PATENT DOCUMENTS

EP 2369479 A2 9/2011
EP 2562973 2/2013

OTHER PUBLICATIONS

Lizhe Wang et al., Scientific Cloud Computing:Early Definition and Experience, Oct. 2008, [Retrieved on Jul. 19, 2016]. Retrieved from the internet: <URL: https://www.researchgate.net/profile/Lizhe_Wang4/publication/224332403.pdf> 19 Pages (1-18).*

(Continued)

*Primary Examiner* — Thuy Dao
*Assistant Examiner* — Anibal Rivera

(57) ABSTRACT

Methods and apparatus to automatically configure monitoring of a virtual machine are disclosed. An example method includes identifying a virtual machine in an application definition, automatically installing an agent on the virtual machine when the virtual machine is identified as having a designated configuration, automatically identifying, via the agent, a resource associated with the virtual machine and, based on the resource, applying a monitoring policy to the virtual machine to be executed by the agent.

26 Claims, 12 Drawing Sheets

(51) Int. Cl.
*G06F 9/46* (2006.01)
*G06F 9/50* (2006.01)
*G06F 11/36* (2006.01)
*G06F 9/445* (2006.01)
*G06F 11/30* (2006.01)

(52) U.S. Cl.
CPC .......... *G06F 11/30* (2013.01); *G06F 11/3664* (2013.01); *G06F 9/4443* (2013.01); *G06F 2009/45591* (2013.01)

(56) References Cited

U.S. PATENT DOCUMENTS

| | | | |
|---|---|---|---|
| 7,805,419 B2 | 9/2010 | Newman | |
| 7,930,381 B2 | 4/2011 | Attanasio et al. | |
| 8,175,863 B1* | 5/2012 | Ostermeyer | G06F 17/5009 703/13 |
| 8,209,687 B2 | 6/2012 | Yuyitung et al. | |
| 8,285,929 B2 | 10/2012 | Kaneko et al. | |
| 8,448,170 B2 | 5/2013 | Wipfel et al. | |
| 8,560,671 B1* | 10/2013 | Yahalom | H04L 67/1097 709/224 |
| 8,615,589 B1* | 12/2013 | Adogla | G06F 9/5077 709/226 |
| 8,620,851 B2 | 12/2013 | Brown et al. | |
| 8,650,562 B2* | 2/2014 | Hou | G06F 9/45533 710/15 |
| 8,789,022 B2 | 7/2014 | Neogi | |
| 8,826,274 B2 | 9/2014 | Moriki et al. | |
| 8,874,704 B2 | 10/2014 | Nath et al. | |
| 8,914,768 B2 | 12/2014 | Karnik et al. | |
| 9,003,406 B1 | 4/2015 | Hodge et al. | |
| 9,015,712 B1 | 4/2015 | Hodge et al. | |
| 9,043,786 B1 | 5/2015 | Hodge et al. | |
| 9,047,133 B2* | 6/2015 | Winterfeldt | G06F 8/60 |
| 9,052,961 B2* | 6/2015 | Mangtani | G06F 9/5072 |
| 9,237,060 B2 | 1/2016 | Wu et al. | |
| 9,330,013 B2* | 5/2016 | Li | G06F 12/1009 |
| 2002/0169644 A1* | 11/2002 | Greene | G06Q 10/06311 705/7.18 |
| 2003/0028624 A1 | 2/2003 | Hasan et al. | |
| 2005/0203921 A1 | 9/2005 | Newman et al. | |
| 2006/0036941 A1* | 2/2006 | Neil | G06F 9/4443 715/234 |
| 2006/0047665 A1* | 3/2006 | Neil | G06F 9/4443 |
| 2006/0085530 A1* | 4/2006 | Garrett | G06F 11/3495 709/223 |
| 2006/0085668 A1* | 4/2006 | Garrett | G06F 9/5061 714/4.1 |
| 2006/0085785 A1* | 4/2006 | Garrett | G06F 9/5061 718/1 |
| 2006/0184936 A1* | 8/2006 | Abels | G06F 9/5077 718/1 |
| 2006/0184937 A1* | 8/2006 | Abels | G06F 8/65 718/1 |
| 2006/0294238 A1* | 12/2006 | Naik | G06F 9/5072 709/226 |
| 2007/0250833 A1* | 10/2007 | Araujo | G06F 21/6218 718/1 |
| 2008/0133972 A1 | 6/2008 | Verbowski et al. | |
| 2008/0134175 A1* | 6/2008 | Fitzgerald | G06F 9/45533 718/1 |
| 2008/0209016 A1* | 8/2008 | Karve | G06F 8/61 709/221 |
| 2009/0144420 A1* | 6/2009 | Attanasio | H04L 41/046 709/224 |
| 2009/0169017 A1* | 7/2009 | Smith | G06F 21/57 380/278 |
| 2009/0265707 A1* | 10/2009 | Goodman | G06F 9/5016 718/1 |
| 2009/0328030 A1† | 12/2009 | Fries | |
| 2010/0070725 A1 | 3/2010 | Prahlad et al. | |
| 2010/0125844 A1* | 5/2010 | Mousseau | G06F 9/50 718/1 |
| 2011/0060878 A1 | 3/2011 | Kaneko et al. | |
| 2011/0126197 A1* | 5/2011 | Larsen | H04L 9/3213 718/1 |
| 2011/0126207 A1 | 5/2011 | Wipfel et al. | |
| 2011/0251992 A1* | 10/2011 | Bethlehem | H04L 12/2863 707/610 |
| 2011/0307617 A1 | 12/2011 | Wu et al. | |
| 2012/0066487 A1 | 3/2012 | Brown et al. | |
| 2012/0066681 A1* | 3/2012 | Levy | G06F 9/5027 718/1 |
| 2012/0117212 A1* | 5/2012 | Fries | G06F 8/61 709/223 |
| 2012/0284713 A1* | 11/2012 | Ostermeyer | G06F 17/5009 718/1 |
| 2012/0311475 A1* | 12/2012 | Wong | G06F 11/3003 715/772 |
| 2012/0331388 A1 | 12/2012 | Nedelcu et al. | |
| 2013/0007265 A1* | 1/2013 | Benedetti | H04L 67/1097 709/224 |
| 2013/0007740 A1* | 1/2013 | Kikuchi | H04L 41/5012 718/1 |
| 2013/0042003 A1* | 2/2013 | Franco | H04L 67/1097 709/226 |
| 2013/0054426 A1* | 2/2013 | Rowland | G06F 9/5011 705/27.2 |
| 2013/0111468 A1* | 5/2013 | Davis | G06F 9/5077 718/1 |
| 2013/0185715 A1* | 7/2013 | Dunning | H04L 41/0803 718/1 |
| 2013/0219363 A1* | 8/2013 | Wu | G06F 11/3664 717/124 |
| 2013/0283102 A1 | 10/2013 | Krajec et al. | |
| 2013/0283263 A1* | 10/2013 | Elemary | G06F 9/45558 718/1 |
| 2014/0019597 A1 | 1/2014 | Nath et al. | |
| 2014/0040656 A1* | 2/2014 | Ho | G06F 9/5077 714/3 |
| 2014/0237472 A1* | 8/2014 | Adogla | G06F 9/5077 718/1 |
| 2014/0380308 A1 | 12/2014 | Hassine et al. | |

OTHER PUBLICATIONS

Lizhe Wang et al., Provide Virtual Machine Information for Grid Computing, Nov. 2010, [Retrieved on Jul. 19, 2016]. Retrieved from the internet: <URL: http://ieeexplore.ieee.org/stamp/stamp.jsp?tp=&arnumber=5546997> 13 Pages (1362-1374).*
International Searching Authority, International Application No. PCT/US2014/067322 filed Nov. 25, 2014, Notification of Transmittal of the International Search Report and the Written Opinion of the International Searching Authority, or the Declaration, International Search Report and Written Opinion of the International Searching Authority mailed Feb. 17, 2015, 14 pages.
"White Paper: A Blueprint for Better Management from the Desktop to the Data Center," Novell, Inc., Feb. 2007, 17 pages.
Hu et al., "JAVA Blueprint Procedure Pattern," IEEE, 2013, 5 pages.
"Using VMware vFabric Application Director," VMware, Inc., 2012, 164 pages.
"vCioud Director User's Guide," VMware, Inc., 2010, 126 pages.
"Infrastructure Navigator User's Guide," VMware, Inc., 2012, 38 pages.
United States Patent and Trademark Office, "Non-Final Office Action," issued in connection with U.S. Appl. No. 13/926,813, Jun. 18, 2015, 13 pages.
"What is Puppet?," Puppet Labs, 2014, 4 pages.
"Puppet Enterprise," Puppet Labs, 2014, 4 pages.
Dan Mitchell, "DynamicOps Cloud Development Kit: Overview and Concepts: Extending Your Cloud to New Use Cases," DynamicOps, Inc., Jun. 2012, 12 pages.
Rich Bourdeau, "DynamicOps Extensibility Overview: Enable, Adapt, and Extend your Infrastructure into a Business Relevant Cloud," DynamicOps, May 2012, 12 pages.

(56) References Cited

OTHER PUBLICATIONS

Vladan Seget, "vCloud Automation Center Introduced by VMware," retrieved from the Internet on Nov. 30, 2012, at <http://www.vladan.fr/vcloud-automation-center-introduced-by-vmware/>, 7 pages.

"DynamicOps Cloud Automation Center Design Center Datasheet," DABCC, Apr. 12, 2011, webpage and linked datasheet, retrieved from the Internet on Mar. 27, 2014, at <http://www.dabcc.com/article.aspx?id=17668>, 6 pages.

VMware, "VMware vCenter Infrastructure Navigator," 2013, 1 page.

VMware, "VMware vFabric™ Application Director," 2013, 2 pages.

United States Patent and Trademark Office, "Non-Final Office Action," issued in connection with U.S. Appl. No. 14/191,020, Jul. 30, 2015, 14 pages.

VMware, "Introduction to Hyperic Monitoring," retrieved from the Internet on May 12, 2014, at <http://pubs.vmware.com/vfabric5/index.jsp?topic=/com.vmware.vfabric.hyperic.4.6/Introduction_to_Hyperic_Monitoring.html>, 3 pages.

United States Patent and Trademark Office, "Non-Final Office Action," issued in connection with U.S. Appl. No. 14/319,326, Sep. 25, 2015, 9 pages.

Su Bhasish Bhattacharya, "Clustering and High-Availability," MSDN blogs, including sections (1) How to configure VM Monitoring in Windows Server 2012 and (2) VM Monitoring in Windows Server 2012—Frequently Asked Questions, 2012, 8 pages.

Microsoft, "TechNet Library," Oct. 13, 2013, Microsoft TechNet, including sections (1) Add-ClusterVMMonitoredItem, Get-ClusterVMMonitoredItem and (2) Remove-ClusterVMMonitoredItem, retrieved from <http://web.archive.org/web/20131111124419/http://technet.microsoft.com/enus/library>, 11 pages.

United States Patent and Trademark Office, "Final Office Action," issued in connection with U.S. Appl. No. 14/191,020, Feb. 10, 2016, 24 pages.

United States Patent and Trademark Office, "Final Office Action," issued in connection with U.S. Appl. No. 14/319,326, Mar. 29, 2016, 7 pages.

IBM, "Tivoli—IBM Tivoli Monitoring for Virtual Servers: VMware VI Agent," version 6.2.1, IBM Corp., 2008, 207 pages.

\* cited by examiner
† cited by third party

| Agent Management | |
|---|---|
| Agent Configuration | | vCenter Server: [WINDOWSVC02 ▶]

ACTION PARAMETERS

| | | |
|---|---|---|
| 902 → | Hyperic server IP address: | 10.23.25.253 |
| 904 → | Hyperic user name: | hqadmin |
| 906 → | Hyperic password: | ******** |
| 908 → | Install package URL: | https://$VIN-IP:2860 |
| 910 → | Linux installation directory: | /opt/hyperic |
| 912 → | Windows installation directory: | C:\hyperic |
| 914 → | Hyperic agent version: | 5.7.0 |
| 916 → | Configure Hyperic agent as a service (Linux only): | yes |
| 918 → | Secure connection to server (yes/no): | yes |
| 920 → | Hyperic server port: | 7080 |
| 922 → | Hyperic server SSL port: | 7443 |
| 924 → | Hyperic agent port: | 2144 |
| 926 → | Unidirectional (yes/no): | no |
| 928 → | Agent files SHA-256 (comma-separated): | 6cfaeb90067abe4864a6d7607399646bc296 |

[Save]

Filter: exc2010

| Name | Agent Status | Last status update | Issues |
|---|---|---|---|
| DC02-AL(Server 2008R2 x8... | ⚠ Agent down | 47 mins ago | ←1004 |
| EXC2010-Load Generator | ⊘ Agent not installed | 5 mins ago | ←1006 |
| EXC2010-Unified Messagin... | ⊘ Agent not installed | 5 mins ago | ←1008 |
| EXC2010-MailBox Server | ⊘ Agent not installed | 5 mins ago | ←1010 |
| EXC2010-Hub Transport Se... | ⊘ Agent not installed | 5 mins ago | ←1012 |
| EXC2010-Edge Transport_2... | ⊘ Agent not installed | 4 mins ago | ←1014 |
| EXC2010-Client Access Ser... | Unknown | | ←1016 |

Filter: exc2010

| Name | Agent Status | Last status update | Issues |
|---|---|---|---|
| DC02-AL(Server 2008R2 x8... | ⚠ Agent down | 47 mins ago | ←1004 |
| EXC2010-Unified Messagin... | ⊘ Agent not installed | 5 mins ago | ←1008 |
| EXC2010-Hub Transport Se... | ⊘ Agent not installed | 5 mins ago | ←1012 |
| EXC2010-MailBox Server | ⊘ Agent not installed | 5 mins ago | ←1010 |
| EXC2010-Edge Transport_2... | ⊘ Agent not installed | 4 mins ago | ←1014 |
| EXC2010-Load Generator | ⊘ Agent not installed (in progress: install agent) | 5 mins ago | ←1006 |
| EXC2010-Client Access Ser... | Unknown | | ←1016 |

↑1002

| Auto-Discovery | | | 1300 |
|---|---|---|---|
| Resource name | | Status | Changes |
| ⦿ EXC2012-ELG.al.vmware.com – Microsoft Windows 2008 | | ←1302 new | N/A |
| ☑ EXC2012-ELG HQ Agent 5.7.0 | C:\hyperic\hyperic-hqee-agent-5.7.0 | ←1304 new | N/A |
| ☑ EXC2012-ELG .NET 3.5 | C:\Windows\Microsoft.Net\Framework64 | ←1306 new | N/A |
| ☑ EXC2012-ELG IIS 7.x | C:\Windows\System32 | ←1308 new | N/A |
| [Add to Inventory] [Skip Checked Resources] | | | |

FIG. 13

| Recently Added | | 1400 |
|---|---|---|
| Resource name | | Time |
| ⦿ EXC2012-ELG.al.vmware.com – Microsoft Windows 2008 | ←1302 | 0 seconds ago |

FIG. 14

METHODS AND APPARATUS TO AUTOMATICALLY CONFIGURE MONITORING OF A VIRTUAL MACHINE

RELATED APPLICATION

This patent claims priority to U.S. Provisional Patent Application Ser. No. 61/911,375, filed Dec. 3, 2013. The entirety of U.S. Provisional Patent Application Ser. No. 61/911,375 is incorporated herein by reference.

FIELD OF THE DISCLOSURE

This disclosure relates generally to cloud computing and, more particularly, to methods and apparatus to automatically configure monitoring of a virtual machine.

BACKGROUND

"Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a great scale and fast pace.

BRIEF DESCRIPTION OF THE DRAWINGS

FIG. 9 illustrates an example interface that may be presented by the example performance monitoring server of FIG. 1 to enable configuration of agents for installation on VMs based on a management policy.

FIG. 10 illustrates an example interface that may be presented by the example performance monitoring server of FIG. 1 illustrating agent statuses for example VMs following discovery of the VMs in a deployment environment.

FIG. 11 illustrates an example interface that may be presented by the example performance monitoring server of FIG. 1 illustrating agent statuses for example VMs following initialization of agent installation for one of the example VMs.

FIG. 13 illustrates an example interface that may be presented by the example performance monitoring server of FIG. 1 illustrating available resources associated with a VM in a deployment environment following discovery of the resources by an agent installed on the VM.

FIG. 14 illustrates an example interface that may be presented by the example performance monitoring server of FIG. 1 illustrating discovered resources associated with a VM in a deployment environment following adding the resources to a group and/or to inventory.

Wherever appropriate, the same reference numbers will be used throughout the drawing(s) and accompanying written description to refer to the same or like parts.

DETAILED DESCRIPTION

Figure 1:
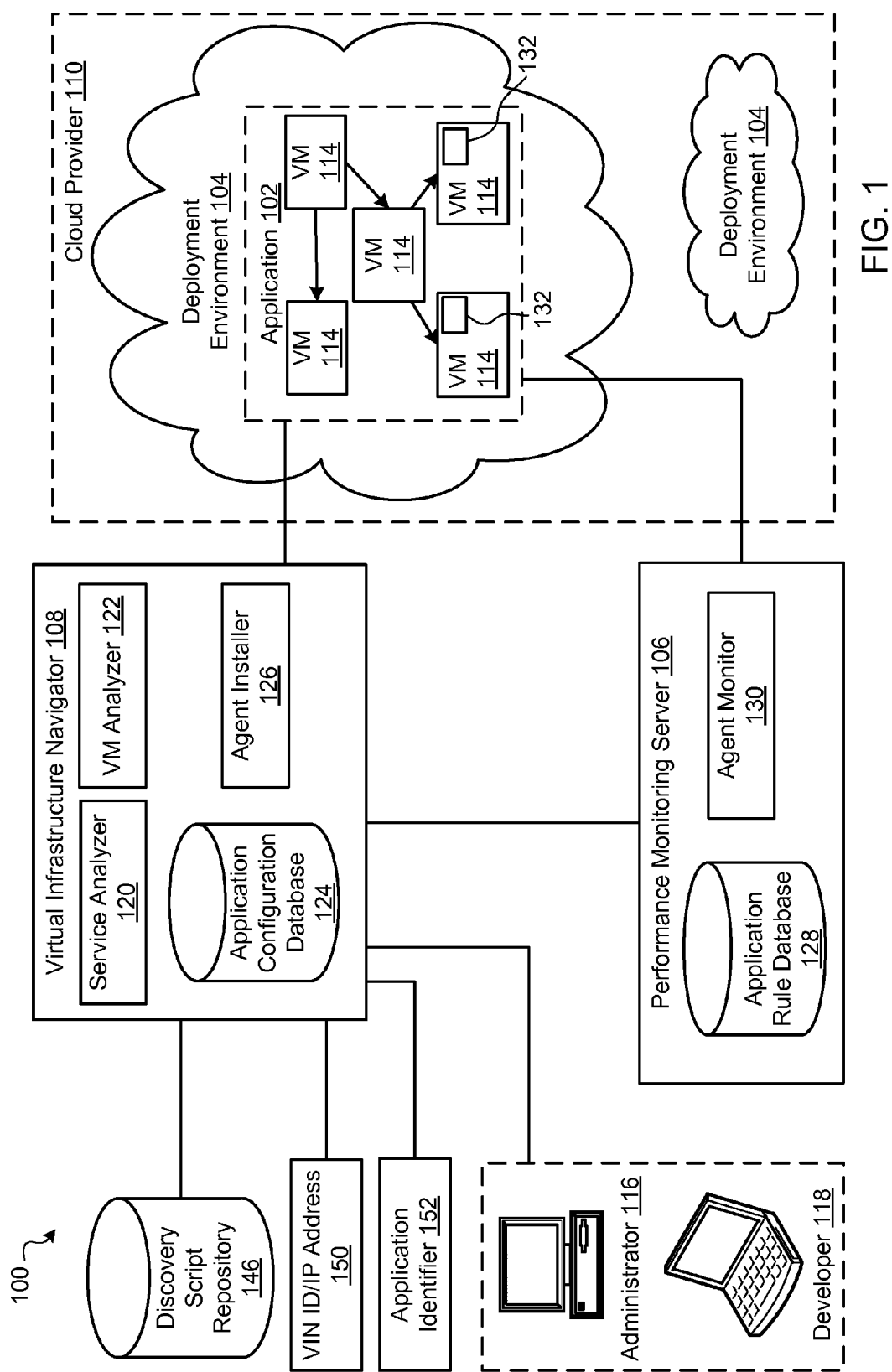
FIG. 1 depicts an example system constructed in accordance with the teachings of this disclosure for automatically configuring monitoring of a deployment environment including an application.

Organizations have a need to monitor performance of their information technology resources. Monitoring may be accomplished using agents on the monitored machines. As used herein, the term "agent" refers to software installed on a machine (virtual or physical) that provides an interface to enable remote control of the machine for execution of commands, scripts, and/or other code. The agents monitor designated aspects of the machine (e.g., hardware, software, and/or firmware aspects) and report data related to the monitored aspects to a monitoring server. In some disclosed examples, the monitoring server processes and/or formats the monitored aspects and presents the results to an administrator or other user (e.g., person) associated with the machines.

Cloud environments are dynamic by nature. Resources, such as virtual machines (e.g., Windows and/or Linux servers) and/or application services, may be created, used, moved and/or destroyed with relatively high frequency. In such dynamic environments, monitoring the resources (e.g., virtual machines, applications, services, etc.) can be challenging because, among other things, new resources are often created, resources change their location, and/or the configurations of the resources change. Such changes result in changes to monitoring requirements for the resources.

Example methods and apparatus disclosed herein automate monitoring of resources in cloud environments. In some examples, an infrastructure navigator examines or scans virtual machines (VMs) for configuration information. Example methods and apparatus disclosed herein compare the determined configurations of the VMs to rules (e.g., management rules, monitoring rules, etc.) defined in management policies. If the configurations match designated rules, a monitoring agent (e.g., a performance monitoring agent) is installed on the VM to monitor the VM.

Example methods and apparatus disclosed herein automate the registration of resources of a VM with a monitoring server. In some examples, a monitoring agent that is installed (e.g., automatically installed) on a VM automatically discovers resources associated with the VM. Example resources may include a platform executing on the VM, servers executing on the VM, and/or services executing on the VM. In examples disclosed herein, the identified resources are reported to a monitoring server, which registers the resources and/or applies monitoring policies to the resources based on defined management policies. In some examples, the monitoring server automatically adds the resources to an inventory of resources monitored by the monitoring server. In some examples, the monitoring policies are applied to the VMs via the monitoring agents. By automatically analyzing the VMs, installing the monitoring agents on designated VMs, and/or automatically configuring the monitoring agents and/or the VMs, example methods and apparatus disclosed herein improve the efficiency of monitoring of deployment environments, applications, and/or services. Additionally, example methods and apparatus disclosed herein automatically update the monitoring configurations of a deployment environment in response to changes to the VMs in the deployment environment.

As used herein, the term "cluster" refers to a collection of hosts that can be managed as a single entity. The resources from the hosts in a cluster may be aggregated into a single pool. A cluster appears as a stand-alone host, but typically has more resources available.

As used herein, the term "deployment environment" refers to an environment in a cloud. A deployment environment may be used, for example, for development, testing, staging, and/or production. A cloud can have multiple deployment environments.

As used herein, the term "service" refers to scripted software that can be installed on a VM and reused in multiple applications.

As used herein, the term "properties" refers to configuration variables used by scripts to set parameters on a script and run various configurations. For example, setting an installation_path property value causes installation scripts to use the property to specify the path to use to install a service during an application deployment process.

As used herein, the term "inventory" refers to a list of resources. In some examples, each monitoring server maintains a separate inventory associated with agents and/or VMs being monitored.

FIG. 1 depicts an example system 100 constructed in accordance with the teachings of this disclosure for automatically configuring monitoring of a deployment environment 104 including an application 102. In the example of FIG. 1, the application 102 is a customized multi-tier application (e.g., modified from component templates) and is initially deployed in the deployment environment 104. The example system 100 of FIG. 1 includes a performance monitoring server 106 and a virtual infrastructure navigator 108. The example virtual infrastructure navigator 108 may be used to automatically analyze the application 102, identify changes to the application 102, and/or automatically configure monitoring and/or management of the applications as described in more detail below.

The example application 102 of FIG. 1 is deployed in the deployment environment 104 provided by a cloud computing platform provider 110 (also referred to herein simply as a "cloud provider"). The example cloud computing platform provider 110 of FIG. 1 may include any number of deployment environments 104.

The example application 102 of FIG. 1 includes multiple VMs 114. The example VMs 114 of FIG. 1 provide different functions within the application 102 (e.g., services, portions of the application 102, etc.). One or more of the VMs 114 of the illustrated example are configured by an administrator 116 and/or a developer 118 of the application 102 to include one or more resources. Resources may include any computing, storage, or communication asset such as, for example, an agent, software, a platform (e.g., an operating system), a server, a service, memory, and/or storage. A computing unit such as a virtual machine may have multiple resources and/or multiple types of resources.

Additionally, the services executing on the example VMs 114 may have dependencies on one or more other ones of the VMs 114.

In the example of FIG. 1, the example cloud computing platform provider 110 provides multiple deployment environments 104, for example, for development, testing, staging, and/or production of applications. The administrator 116 and/or the developer 118 may access services from the cloud computing platform provider 110, for example, via REST (Representational State Transfer) APIs (Application Programming Interface) and/or via any other client-server communication protocol. One particular implementation of a REST API for cloud computing services is vCloud Director® API available from VMware, Inc. The example cloud computing platform provider 110 provisions virtual computing resources (e.g., the VMs 114) and/or physical resources (e.g., servers, storage, gateways, etc.) to provide the deployment environments 112 in which the administrator 116 and/or developer 118 can deploy multi-tier application(s). One particular example of a deployment environment that may be used to implement the deployment environments 112 of FIG. 1 is vCloud DataCenter cloud computing services available from VMware, Inc.

The example virtual infrastructure navigator 108 of FIG. 1 analyzes the application 102 including the VMs 114 to identify the configurations of the VMs 114. As VMs 114 are deployed, modified, and/or destroyed in the application 102, the example virtual infrastructure navigator 108 continues to analyze the configurations to identify changes in real time or near real time. To analyze the application 102 and/or the VMs 114, the example virtual infrastructure navigator 108 of FIG. 1 includes a service analyzer 120, a VM analyzer 122, an application configuration database 124, and an agent installer 126. The example virtual infrastructure navigator 108 of FIG. 1 is in communication with a discovery script repository 146.

The example service analyzer 120 of FIG. 1 identifies the VMs 114 that are within an application definition. The application definition may be constructed by the administrator 116 and/or developer 118 and describes the application 102 (e.g., services and/or dependencies between aspects of the application 102). In some examples, the service analyzer 120 analyzes an application service package to identify the VMs 114 (e.g., VM name, VM IP address, VM host resource(s), etc.). In some other examples, the example service analyzer 120 receives a VM identifier (e.g., the VIN ID/IP address 150, and/or the application identifier 152 of FIG. 1) from an application director or coordinator (e.g., a vSphere® virtualization platform associated with deployment of the application 102).

The example service analyzer 120 of FIG. 1 receives (e.g., from the administrator 116) a VM identifier (e.g., a VIN ID)

and/or an IP address 150 of a currently-running VM 114. The service analyzer 120 iteratively determines VMs 114 belonging to the application 102 based on the VM identifier and/or the IP address. The example service analyzer 120 of the illustrated example analyzes the VM identifier 150 to determine, for example, IP addresses and/or credentials for the VM(s) 114. Additionally or alternatively, the example service analyzer 120 may receive an application identifier 152 for the application 102, such as a unique application name and an identifier of the deployment environment 104 in which the application 102 is deployed (e.g., from the administrator 116). The example service analyzer 120 of FIG. 1 may be required to translate the discovered properties into logical locations (e.g., IP addresses, URLs, URIs, etc.) at which the VM analyzer 122 may access the VMs 114 to perform analysis. The example service analyzer 120 of FIG. 1 identifies the VMs 114 based on the VM identifier 150 by, for example, querying the cloud computing platform provider 110. The service analyzer 120 of the illustrated example stores identifiers of the VMs 114 included in the application 102 in the application configuration database 124.

As mentioned above, the example service analyzer 120 of FIG. 1 analyzes the VMs 114 to facilitate monitoring of the application 102 and/or the VMs 114. For example, the service analyzer 120 of the illustrated example accesses and/or executes the discovery script(s) in the discovery script repository 146 to discover properties such as dependencies (e.g., between the VMs 114), node cluster definitions, and/or interfaces to other, unidentified ones of the VMs 114 in the application 102. The example service analyzer 120 of FIG. 1 adds the discovered ones of the VMs 114 to a list of VMs 114 to be analyzed by the VM analyzer 122.

The example VM analyzer 122 of FIG. 1 identifies customized configurations (e.g., configuration items) for the identified VMs 114 in the application 102. For example, the VM analyzer 122 selects for analysis the VMs 114 that were identified by the service analyzer 120, defined in the application definition 148, and/or identified in the application configuration database 124. To analyze the example VMs 114, the example VM analyzer 122 of FIG. 1 selects and/or accesses discovery script(s) stored in the discovery script repository 146.

In the illustrated example, discovery scripts execute on the VM analyzer 122 and/or on one or more of the VMs 114 (e.g., using administrator credentials for the VMs 114) to discover configuration items of the VMs 114. For example, the VM analyzer 122 of FIG. 1 may execute the discovery script(s) to access the VM 114 via an interface (e.g., a command and/or text-based interface), through which the VM analyzer 122 may request and receive access to data elements (e.g., configurable items) of the VM 114. In some other examples, the VM analyzer 122 may transfer the discovery script(s) to the VM 114 for execution. The VM analyzer 122 of the illustrated example receives the configurations from the VM 114 (e.g., from communications by the executing discovery script(s)). The example VM analyzer 122 of FIG. 1 stores discovered configuration items in the application configuration database 124. In some examples, the VM analyzer 122 requests and/or executes a first discovery script in the discovery script repository 146, which results in calling additional discovery scripts based on the discovered configurations of the VMs 114. In the example of FIG. 1, the VM analyzer 122 stores the discovered properties and configurations in association with data for respective ones of the VMs 114.

In some examples, the discovery script(s) used by the service analyzer 120 to analyze and determine the application definition 148 are different than discovery script(s) used by the VM analyzer 122 to determine configurations of the VMs 114. For instance, the example service analyzer 120 of FIG. 1 calls a first discovery script to determine the application definition based on an identification of a seed VM 114, and the example VM analyzer 122 calls a second discovery script to obtain the configurations of the VMs 114.

In the example of FIG. 1, the example VM analyzer 122 identifies configuration elements of the VMs 114. Example configuration elements that may be discovered by the VM analyzer 122 (e.g., via the discovery scripts) include: a primary workload of the VM 114, dependencies between the VMs 114, services, and/or other application components in the application 102; node cluster definitions; load balancing; port configurations; ciphers; custom drivers; and/or limits on simultaneous executing threads. Additionally or alternatively, the example VM analyzer 122 may execute the discovery scripts to discover any other customized application configuration elements. For example, the VM analyzer 122 of FIG. 1 may execute the discovery scripts to discover configurations stored on the VM 114 in files, operating system registry keys, and/or in any other source for implementing customized application configurations. The example VM analyzer 122 stores the configuration information (e.g., identified configuration items such as the primary workload) in the application configuration database 124.

The example service analyzer 120 and/or the example VM analyzer 122 of FIG. 1 iteratively (e.g., repeatedly, continuously, etc.) perform the VM discovery and/or configuration identification processes.

The example agent installer 126 of FIG. 1 determines whether an agent 132 (e.g., a performance monitoring agent, such as a VMware Hyperic HQ® agent) is to be installed on the VMs 114. For example, the agent installer 126 determines whether any configuration information obtained from a VM 114 matches a policy or rule (e.g., a monitoring policy, a management policy, etc.) stored in the application configuration database 124 that requires an agent to be installed. For example, the agent installer 126 of FIG. 1 may determine a primary workload of each VM 114. If the primary workload is present in a list of workloads stored in the application rule database 128, the example agent installer 126 of FIG. 1 initiates installation of an agent 132 on the VM 114.

In some examples, the policy or rule determines an initial configuration of the agent 132 installed on the VM 114. Example policies include configuring the agent 132 to communicate with one of multiple performance monitoring servers 106. FIG. 9 illustrates an example interface 900 that may be presented by the example virtual infrastructure navigator 108 (e.g., to the administrator 116 and/or the developer 118) of FIG. 1 to enable an initial configuration of agents 132 for installation on VMs 114 based on a management policy. Example configuration information includes a monitoring server IP address 902, an agent user name 904, an agent user password 906, an installation package location 908, a Linux platform installation directory 910, a Windows platform installation directory 912, an agent version 914, configuration of the agent 132 as a service 916, a secure connection configuration 918 to the performance monitoring server 106, a performance agent server port 920, a performance agent secure server port 922, a performance agent port 924, a unidirectional configuration 926 (e.g., configuring either the agent or the server to initiate all communications, or configuring the agent and the server to initiate respective communications), and/or a checksum hash value 928. The example configuration information 902-928 may be configured by the example administrator 116 and/or the example developer 118 of FIG. 1.

When the virtual infrastructure navigator 108 of FIG. 1 has determined the configurations of the VMs 114 and/or installed the agents 132 on the appropriate ones of the VMs 114, the example performance monitoring server 106 of FIG. 1 automatically registers the agents 132 on the VMs 114 (e.g., based on whether the agents 132 are configured to communicate with the performance monitoring server 106), configures the VMs 114 to be monitored according to a management or monitoring policy and/or performs any other monitoring tasks associated with the application 102.

The example performance monitoring server 106 of FIG. 1 includes an application rule database 128 and an agent monitor 130. The example system 100 of FIG. 1 may include multiple performance monitoring servers 106 to monitor agents 132 that are configured differently based on, for example, the resource(s) being monitored by the respective agents 132. Multiple performance monitoring servers 106 may additionally or alternatively be used to monitor different deployment environments 104, different applications 102, and/or different VMs 114. The example agents 132 may be initially configured by the agent installer 126 to communicate with a designated one of the performance monitoring servers 106.

Upon installation and execution of the example agent 132 on a VM 114 of FIG. 1, the agent 132 of the illustrated example identifies the resources in the VM 114. Examples of such resources include the platform (e.g., operating system), server(s) executing on the VM 114, and/or services executing on the VM 114. The example agent 132 returns a report of identified resources to the example agent monitor 130 of FIG. 1. The example agent monitor 130 of FIG. 1 determines the configuration for an agent 132 by comparing the resources identified by the agent 132 to rules stored in the application rule database 128. Based on the rule(s) associated with the identified resources, the example agent monitor 130 of FIG. 1 effects and/or enforces the applicable configurations on the agent 132 for the VM 114. For example, the administrator 116 and/or the developer 118 of FIG. 1 may desire to have different monitoring performed on an email server than on an email database or on a web server.

To configure the monitoring, the example administrator 116 and/or the developer 118 may set rules in the application rule database 128 specifying the configuration of agents 132 associated with identified email server resources and specifying another configuration of agents 132 associated with identified web server resources. In some other examples, the administrator 116 and/or the developer 118 may set rules specifying that the agents 132 associated with identified email server resources have the same respective configurations as the agents 132 associated with identified web server resources, but that the agents 132 associated with identified email server resources are grouped in different groups (which apply different monitoring policies) than the agents 132 associated with identified web server resources (e.g., enforce different configurations on the respective VMs 114).

If an agent 132 detects a VM 114 having a configuration different from a configuration to be applied based on the application rule database 128, the example agent 132 of FIG. 1 changes the configuration of the VM 114 to comply with the applicable rule(s) for the VM 114.

The example agent monitor 130 of FIG. 1 additionally or alternatively automatically organizes the monitoring of the resources and/or the VMs 114. For example, the agent monitor 130 may apply grouping rules stored in the application rule database 128 to enable ease of access by the administrator 116 and/or the developer 118. For example, the agent monitor 130 may group the resources in the VMs 114 of FIG. 1 for access by the administrator 116 in association with the application 102. As another example, the agent monitor 130 may group agents 132 and/or resources on the VMs 114 that are associated with email server resources. The example administrator 116 may then access or view performance information monitored by the agents 132 for email servers by selecting an email server group.

In examples in which there are conflicting configuration rules, the example agent monitor 130 selects between the conflicting rules. For example, the configuration rules may have priorities to enable the agent monitor 130 to select between the rules based on the resources. Additionally or alternatively, the configuration rules may affect different sets of configuration information. In such cases, the example agent monitor 130 may send less than a complete set of configuration information to the agent 132, such as configuration information that affects designated configuration items in the agent 132 without affecting other items.

FIG. 10 illustrates an example interface 1000 that may be presented by the example performance monitoring server 106 of FIG. 1. The example interface 1000 illustrates agent statuses 1002 for example VMs 1004-1016 following discovery of the VMs 1004-1016 in a deployment environment (e.g., the deployment environment 104 of FIG. 1). In the example of FIG. 10, the example VM 1004 has an installed agent, VMs 1006-1014 do not have an installed agent, and the VM 1016 has an unknown agent status (e.g., because the VM 1016 may be suspended).

FIG. 11 illustrates an example interface 1100 that may be presented by the example performance monitoring server 106 of FIG. 1. The example interface 1100 of FIG. 11 displays agent statuses 1002 for the example VMs 1004-1016 following initialization of agent installation (e.g., via the agent installer 126) for the example VM 1006. The example interface 1100 of FIG. 11 shows that the installation of the agent is in progress.

Figure 12:
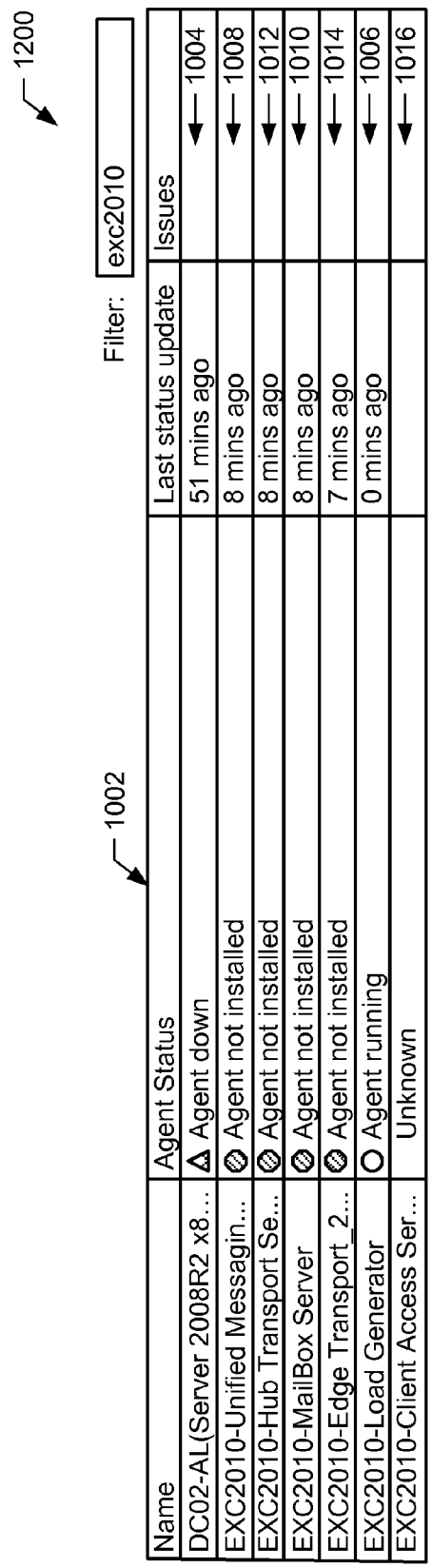
FIG. 12 illustrates an example interface that may be presented by the example performance monitoring server of FIG. 1 illustrating agent statuses for example VMs following completion of installation of an agent on one of the example VMs.

FIG. 12 illustrates an example interface 1200 that may be presented by the example performance monitoring server 106 of FIG. 1. The example interface 1200 of FIG. 12 displays agent statuses 1002 for example VMs 1004-1016 following completion of installation of an agent 132 on the example VM 1006. The example interface 1200 of FIG. 12 shows that the agent is running and, thus, has been installed and started.

In FIG. 13 illustrates an example interface 1300 that may be presented by the example performance monitoring server 106 of FIG. 1. The example interface 1300 of FIG. 13 displays available resources 1304-1308 associated with a resource 1302 in a deployment environment (e.g., the deployment environment 104) following discovery of the resources 1304-1308 by an agent 132 installed on the VM (e.g., the VMs 114 of FIG. 1, the VM 1006 of FIGS. 10-12). In the illustrated example, the example resources 1304-1308 are automatically discovered by the example agent 132 and the performance monitoring server 106.

FIG. 14 illustrates an example interface 1400 that may be presented by the example performance monitoring server 106 of FIG. 1. The example interface 1400 of FIG. 14 displays discovered resources associated with a VM (e.g., the VMs 114 of FIG. 1, the VM 1006 of FIGS. 10-12) in the deployment environment 104 following the automatic addition of the resources 1304-1308 to a group and/or to inventory. For example, the agent monitor 130 of FIG. 1 applies a management policy to one or more of the resources 1304-1308 to add the resources 1304-1308 to a group for ease of monitoring and/or management.

Figure 2:
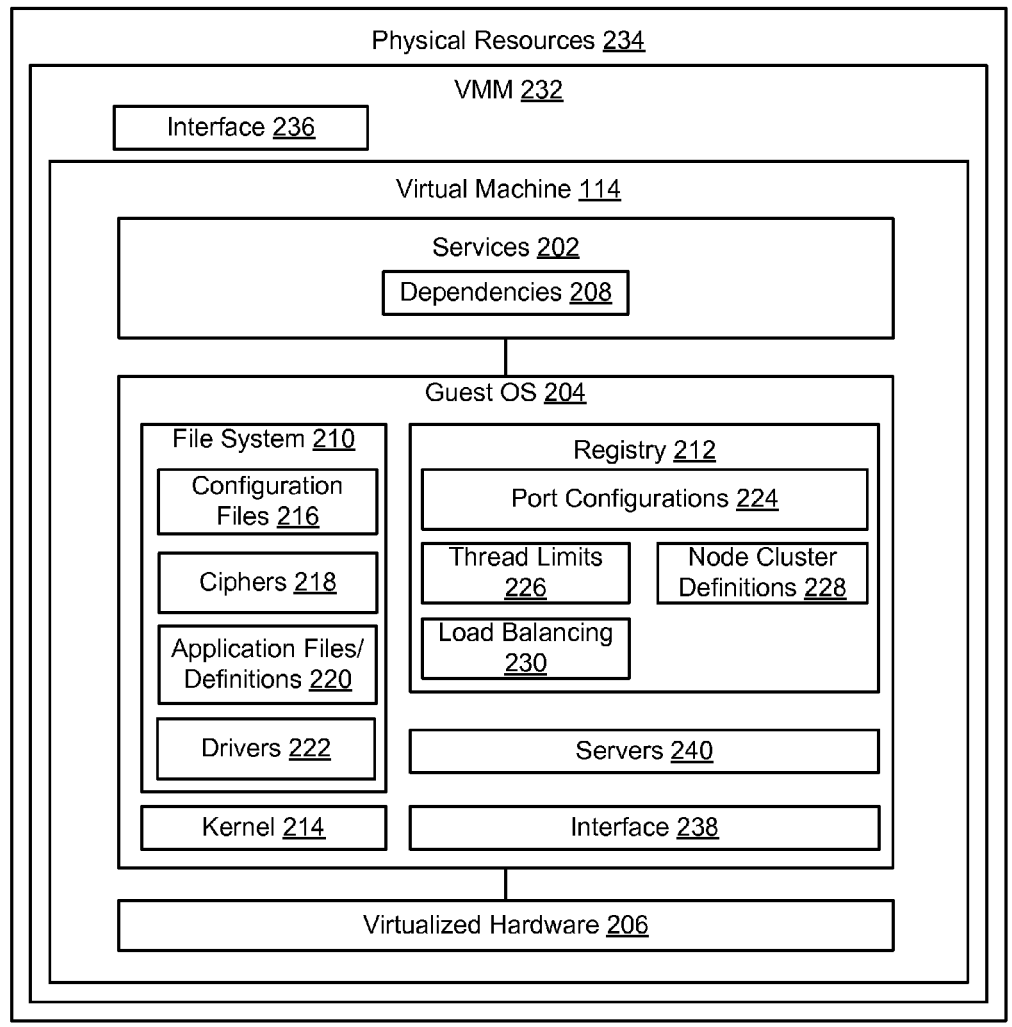
FIG. 2 is a block diagram of an example implementation of the VMs 114 of FIG. 1.

FIG. 2 is a block diagram of an example implementation of one of the VMs 114 of FIG. 1. It is to be understood that FIG. 2 may represent any or all of the VMs 114 of FIG. 1. The example VM 114 of FIG. 2 may be analyzed by the example system 100 of FIG. 1 (e.g., via the VM analyzer 122 and/or discovery scripts) to automatically and selectively monitor the VM 114. The example VM 114 of FIG. 2 executes a set of services 202 and a guest OS 204 on virtualized hardware 206.

The example services 202 of FIG. 2 may include one or more dependencies 208 (e.g., dependencies on other services, dependencies on services executing on other VMs in the application, etc.). The dependencies 208 may include, for example, input data and/or confirmation of performance of another task prior to execution of a task by the services 202.

The example guest OS 204 of FIG. 2 includes a file system 210, a registry 212, and a kernel 214. The example file system 210 includes configuration files 216, ciphers 218, application files/definitions 220, and custom drivers 222. The example registry 212 of FIG. 2 includes communication port configurations 224, thread limits 226, node cluster definitions 228, and load balancing settings 230. However, the example configuration items 216-230 may be included in and/or divided among any of the virtual components 202-206, 210-214.

To identify properties of the example VM 114, the example VM analyzer 122 of FIG. 1 accesses a virtual machine manager (VMM) 232 that manages the execution of the VM 114 (and other VMs) on physical resources 234. In some examples, the VM analyzer 122 is provided with credentials (e.g., a user name and password of a user or administrator authorized to access the relevant portions of the VM 114) to access the components and/or properties 202-230 via a communications interface 236 of the VMM 232 and/or a communications interface 238 of the VM 114 (e.g., when the VM 114 is executing on the physical resources 234). For example, the VM analyzer 122 of the illustrated example issues text-based commands to the VM 114 to access data from the file system 210, the registry 212, and/or the kernel 214.

In addition to the services 202 and/or the guest OS 204, the example VM 114 of FIG. 2 executes one or more servers 240. The server(s) 240 of the illustrated example may receive requests, perform functions, and/or return responses to requesting entities.

The example file system 210, the example registry 212, the example kernel 214, the example configuration files 216, the example ciphers 218, the example application files/definitions 220, the example custom drivers 222, the example communication port configurations 224, the example thread limits 226, the example node cluster definitions 228, and the example load balancing settings 230 of the example illustrated in FIG. 2 are virtualized components. In some examples, the VM analyzer 122 (e.g., via executing discovery scripts) accesses data representative of the VM 114 (e.g., a stored VM file, a VM suspended state or snapshot state file, a virtual memory file, etc.) to identify the properties from the VM components 202-230. The example VM 114 may access the data representative of the VM 114 via the VMM 232 (e.g., via the interface 236) and/or via the physical resources 234 (e.g., in a physical storage device or memory).

While an example manner of implementing the system 100 is illustrated in FIG. 1, one or more of the elements, processes and/or devices illustrated in FIG. 1 may be combined, divided, re-arranged, omitted, eliminated and/or implemented in any other way. Further, the example application 102, the example deployment environment 104, the example application director 106, the example performance monitoring server 106, the example virtual infrastructure navigator 108, the example cloud provider 110, the example deployment environment 112, the example VMs 114, the example service analyzer 120, the example VM analyzer 122, the example application configuration database 124, the example agent installer 126, the example application rule database 128, the example agent monitor 130, the example agents 132, the example discovery script repository 146 and/or, more generally, the example system 100 of FIG. 1 may be implemented by hardware, software, firmware and/or any combination of hardware, software and/or firmware. Thus, for example, any of the example application 102, the example deployment environment 104, the example application director 106, the example performance monitoring server 106, the example virtual infrastructure navigator 108, the example cloud provider 110, the example deployment environment 112, the example VMs 114, the example service analyzer 120, the example VM analyzer 122, the example application configuration database 124, the example agent installer 126, the example application rule database 128, the example agent monitor 130, the example agents 132, the example discovery script repository 146 and/or, more generally, the example system 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example application 102, the example deployment environment 104, the example application director 106, the example performance monitoring server 106, the example virtual infrastructure navigator 108, the example cloud provider 110, the example deployment environment 112, the example VMs 114, the example service analyzer 120, the example VM analyzer 122, the example application configuration database 124, the example agent installer 126, the example application rule database 128, the example agent monitor 130, the example agents 132, and/or the example discovery script repository 146 is/are hereby expressly defined to include a tangible computer readable storage device or storage disk such as a memory, a digital versatile disk (DVD), a compact disk (CD), a Blu-ray disk, etc. storing the software and/or firmware. Further still, the example system 100 of FIG. 1 may include one or more elements, processes and/or devices in addition to, or instead of, those illustrated in FIG. 1, and/or may include more than one of any or all of the illustrated elements, processes and devices.

Figure 3:
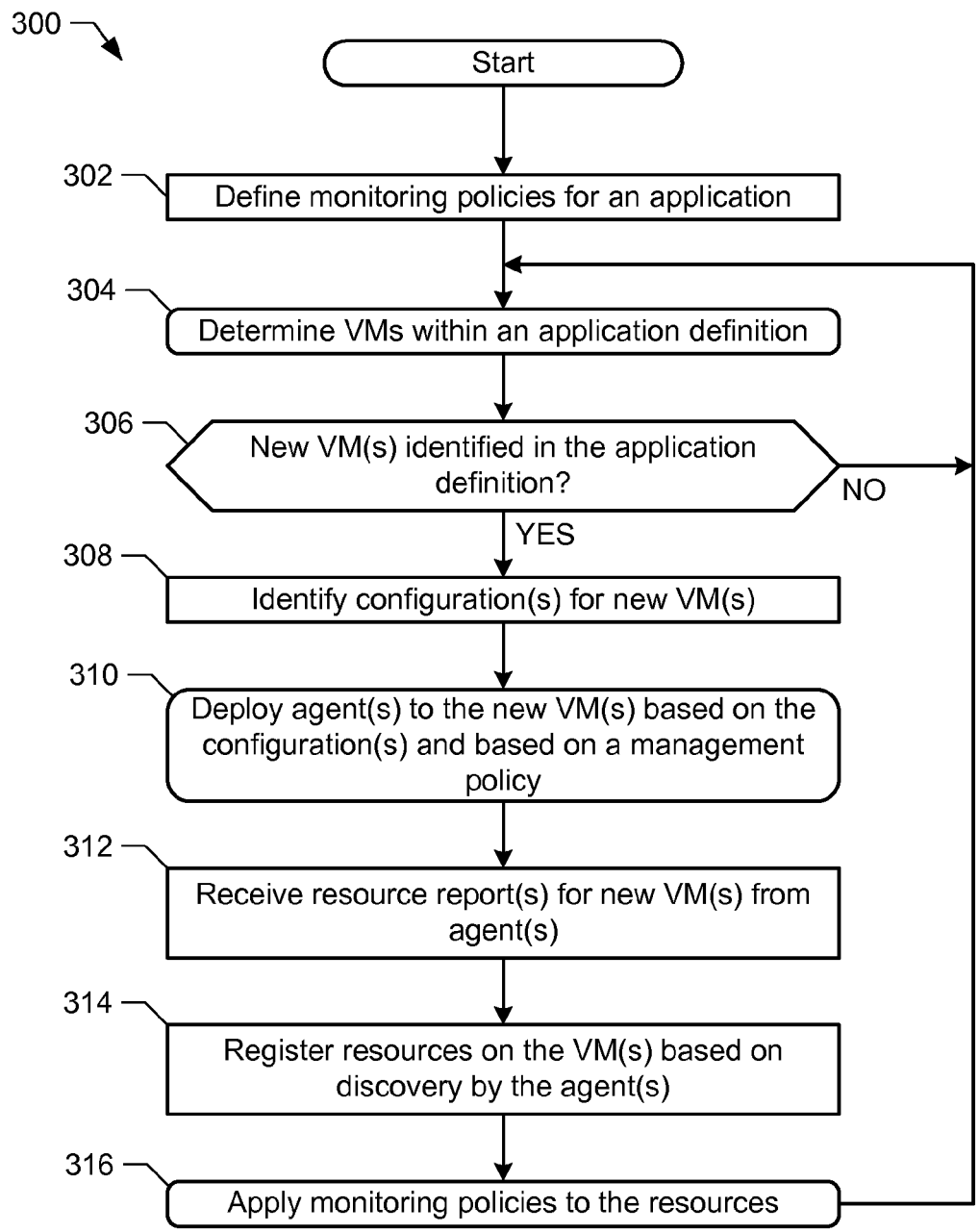
FIG. 3 is a flowchart representative of example machine readable instructions which may be executed to implement the example system of FIG. 1 to automatically configure and/or monitor VMs in a deployment environment.

Flowcharts representative of example machine readable instructions for implementing the system 100 of FIG. 1 is shown in FIG. 3, 4, 5, 6, and/or 7. In this example, the machine readable instructions comprise programs for execution by a processor such as the processor 812 shown in the example processor platform 800 discussed below in connection with FIG. 8. The programs may be embodied in software stored on a tangible computer readable storage medium such as a CD-ROM, a floppy disk, a hard drive, a digital versatile disk (DVD), a Blu-ray disk, or a memory associated with the processor 812, but the entire programs and/or parts thereof could alternatively be executed by a device other than the processor 812 and/or embodied in firmware or dedicated hardware. Further, although the example programs are described with reference to the flowchart illustrated in FIGS. 3-7, many other methods of implementing the example system 100 may alternatively be used. For example, the order of execution of the blocks may be changed, and/or some of the blocks described may be changed, eliminated, or combined.

As mentioned above, the example processes of FIGS. 3-7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 3-7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disk and to exclude propagating signals. As used herein, when the phrase "at least" is used as the transition term in a preamble of a claim, it is open-ended in the same manner as the term "comprising" is open ended.

FIG. 3 is a flowchart representative of example machine readable instructions 300 which may be executed to implement the example system 100 of FIG. 1 to automatically configure and/or monitor VMs (e.g., the VMs 114) in a deployment environment (e.g., the deployment environment 112).

The example performance monitoring server 106 of FIG. 1 defines monitoring policies for an application (e.g., the application 102 of FIG. 1) (block 302). For example, the performance monitoring server 106 of FIG. 1 stores policies and/or rules to be implemented based on configurations of the VMs 114 and/or resources executing on the VMs 114. In some examples, the rules are defined by the administrator 116 and/or the developer 118 of FIG. 1 based on a desired monitoring configuration of the application 102.

The example virtual infrastructure navigator 108 of FIG. 1 determines VMs 114 within an application definition (block 304). For example, the service analyzer 120 of FIG. 1 may determine whether any VMs have been added, removed, and/or modified from a previous application definition for the application 102. Following performance (e.g., execution of instructions) of block 304, the example performance monitoring server 106 may present an interface, such as the interface 1000 of FIG. 10, illustrating statuses of VMs 1004-1016 included in an application. In the example of FIG. 10, any of the example VMs 1006-1016 (e.g., VM(s) not having an agent and/or VM(s) for which an agent status is unknown) may be newly discovered VMs for the application. Example instructions to implement block 304 are disclosed below with reference to FIG. 4.

The example VM analyzer 122 of FIG. 1 determines whether any new VMs have been identified in the application definition (block 306). For example, the VM analyzer 122 may compare a prior application definition to an updated application definition to determine the added, removed, and/or modified VMs 114 in the application 102.

When there are new VMs 114 identified in the application definition (block 306), the example VM analyzer 122 identifies configuration(s) (e.g., configuration items) for the new VMs 114 (block 308). Example configuration items include a primary workload of the VM 114, dependencies between the VMs 114, services, and/or other application components in the application 102; node cluster definitions; load balancing; port configurations; ciphers; custom drivers; and/or limits on simultaneous executing threads. However, the example VM analyzer 122 may execute the discovery scripts to discover any other customized application configuration elements. The example VM analyzer 122 may execute the discovery scripts to discover configurations stored on the VM 114 in files, operating system registry keys, and/or any other source for implementing customized application configurations.

The example agent installer 126 of FIG. 1 deploys agent(s) to the new VM(s) 114 based on the configuration(s) and based on a management policy (block 310). For example, the agent installer 126 may determine whether any of the configuration items identified by the VM analyzer 122 and/or stored in the application configuration database 124 matches a rule stored in the application rule database 128. Example rules stored in the application rule database 128 may be specified by the administrator 116 and/or the developer 118 to implement a management and/or monitoring policy. Example instructions to implement block 310 of FIG. 3 are disclosed below with reference to FIG. 5.

The example agent monitor 130 of FIG. 1 receives resource report(s) for the new VM(s) from the installed agents (block 312). The resource reports may be generated by the agents 132 of FIG. 1 periodically, aperiodically, and/or in response to an event (e.g., on initial installation and/or execution of the agents 132). The resource reports list the resources and/or provide information about the resources (e.g., platform, servers, services, etc.) executing on the VMs 114. Based on the resource report(s) from the agents 132, the example agent monitor 130 registers the identified resources of the VMs 114 (block 314). For example, the agent monitor 130 may add the resources to an inventory and/or include the resources in a listing or catalog of resources available for monitoring.

The example agent monitor 130 applies monitoring policies to the resources (block 316). For example, the agent monitor 130 may determine whether resources and/or configurations of the VMs 114 match monitoring and/or management policy rules for the application 102 stored in the application rule database 128. When resources and/or configurations match an applicable rule, the example agent monitor 130 provides configuration information to the associated agent 132 to configure the agent for monitoring. FIG. 9 illustrates example configurable information associated with an agent. As illustrated in FIG. 9, the performance monitoring server or agent monitor may be specified by, for example, an IP address to configure the agent to report monitoring information to a designated performance monitoring server or agent monitor. Example instructions to implement block 316 of FIG. 3 are disclosed below with reference to FIG. 6.

Figure 4:
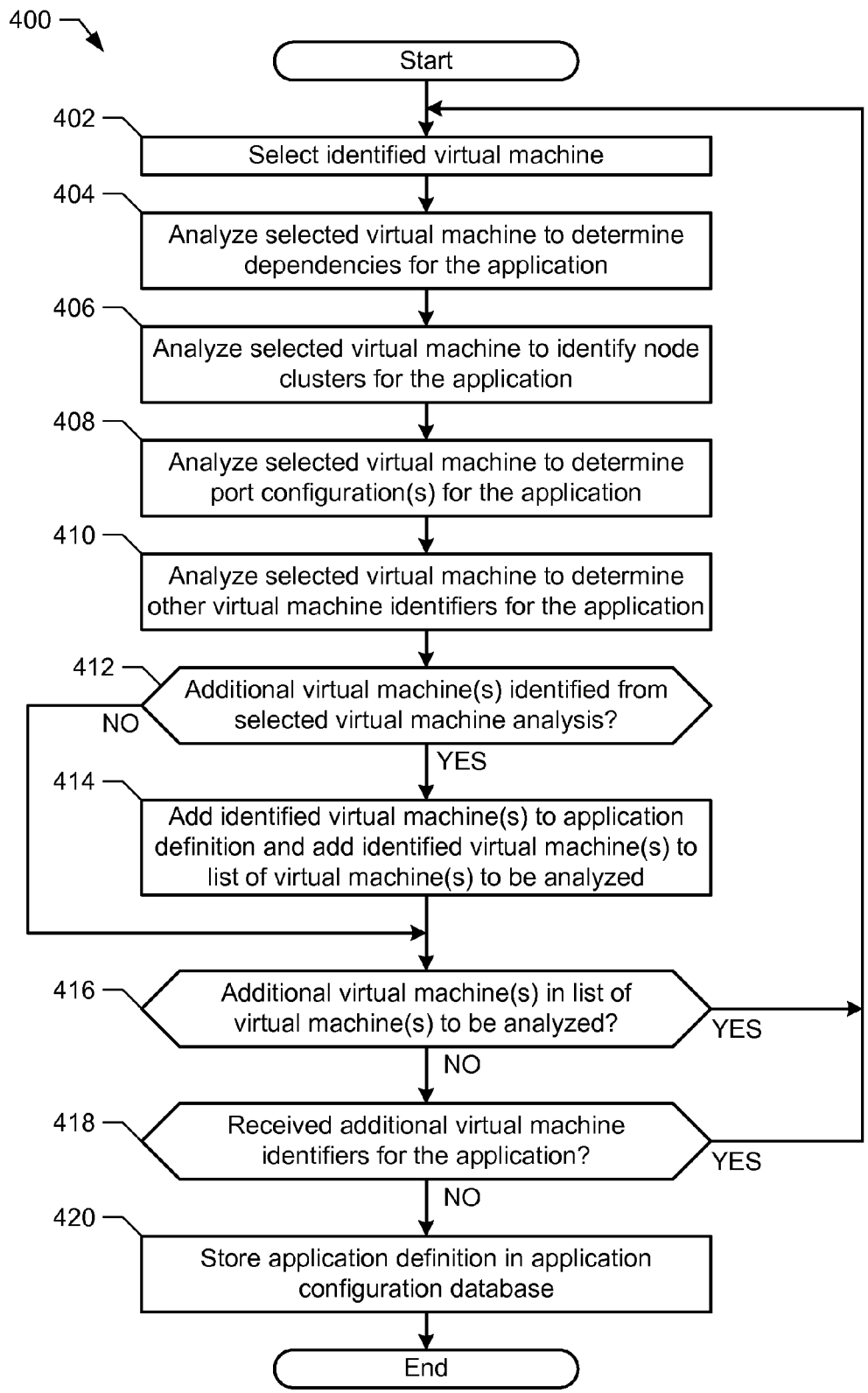
FIG. 4 is a flowchart representative of example machine readable instructions which may be executed to implement the example service analyzer of FIG. 1 to determine VMs in an application.

FIG. 4 is a flowchart representative of example machine readable instructions 400 which may be executed to implement the example service analyzer 120 of FIG. 1 to determine VMs in an application. The example instructions 400 of FIG. 4 may be executed to implement block 304 of FIG. 3.

The example service analyzer 120 of FIG. 1 selects an identified VM 114 (block 402). For example, the service analyzer 120 may be provided with an identification (e.g., the VIN ID/IP address 150 of FIG. 1) of a first VM 114 in the application 102 as a seed VM.

The example service analyzer 120 analyzes the selected VM 114 to determine dependencies for the application 102 (block 404). For example, the service analyzer 120 may determine other service(s) and/or VMs 114 on which services operating on the selected VM 114 depend.

The example service analyzer 120 analyzes the selected VM 114 to identify node clusters for the application (block 406). For example, the selected VM 114 may be configured in a cluster of VMs 114 that are part of the application 102.

The example service analyzer 120 of FIG. 1 analyzes the selected VM 114 to determine port configuration(s) for the application (block 408). For example, the VMs 114 in the application 102 may be configured to communicate with other ones of the VMs 114 at different IP addresses via designated ports. By identifying the port configuration(s), the example service analyzer 120 may obtain the IP addresses and/or identifiers of other VMs 114 in the application 102.

The example service analyzer 120 of FIG. 1 analyzes the selected VM 114 to determine other VM identifiers for the application 102 (block 410). For example, the service analyzer 120 may analyze any other configuration items of the VMs 114 in the application 102 from which additional VMs 114 in the application 102 may be identified.

The example service analyzer 120 of FIG. 1 determines whether additional VMs 114 have been identified from analysis of the selected VM (block 412). If VMs have been identified (block 412), the example service analyzer 120 adds any identified (e.g., newly-identified) VMs 114 to a list of VMs to be analyzed (block 414). The list of VMs to be analyzed may be used by the example service analyzer 120 to identify further VMs 114 in the application 102 and/or by the VM analyzer 122 of FIG. 1 to identify the configurations of the VMs 114.

After adding identified VMs 114 to the list (block 414), or if no additional VMs have been identified by analyzing the selected VM (block 412), the example service analyzer 120 determines whether additional VMs in the list of VMs are to be analyzed (block 416). If there are no additional VMs to be analyzed by the service analyzer 120 (block 416), the example service analyzer 120 determines whether another VM identifier (e.g., another VM seed) has been received for the application 102 (block 418). For example, if there are additional VMs 114 in the application 102 that were not identified by the service analyzer 120 by analyzing a first seed VM 114, the example administrator 116 (or another user) may seed an additional VM identifier to the service analyzer 120 to continue identifying the VMs 114 in the application 102. If there are additional VMs 114 in the list (block 416) or if another VM identifier has been received (block 418), control returns to block 402 to select another VM 114 (e.g., from the list or based on a received VM seed).

When there are no additional VMs 114 in the list (block 416) and another VM identifier has not been received (block 418), the example service analyzer 120 stores an application definition in the application configuration database 124 (block 420). The example instructions 400 then end and control returns to block 306 of FIG. 3.

Figure 5:
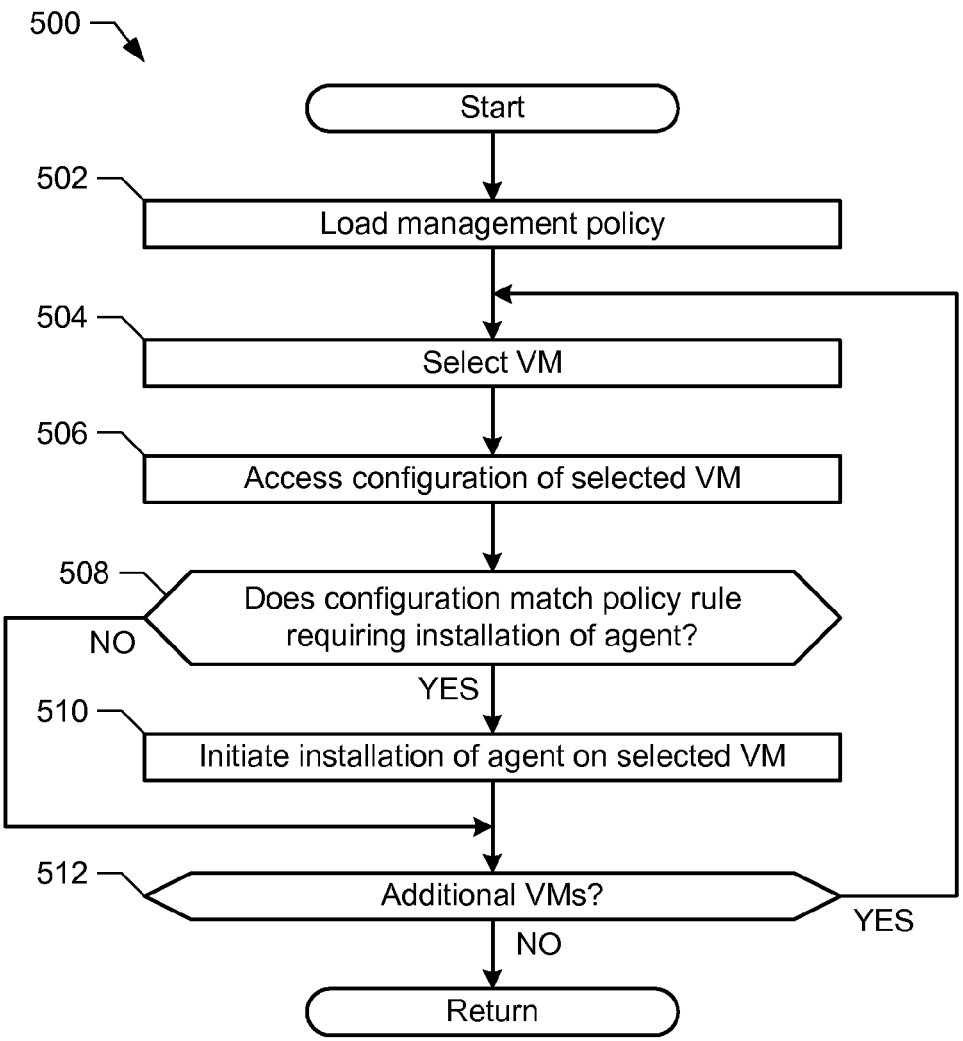
FIG. 5 is a flowchart representative of example machine readable instructions which may be executed to implement the example agent installer of FIG. 1 to deploy agents to VMs based on configuration information and/or management policies.

FIG. 5 is a flowchart representative of example machine readable instructions 500 which may be executed to implement the example agent installer 126 of FIG. 1 to deploy agents to VMs based on configuration information and/or management policies.

The example agent installer 126 of FIG. 1 loads a management policy (e.g., from the application rules database 128) (block 502). An example management policy may specify that an agent is to be installed on VMs 114 executed a particular type of primary workload. The agent installer 126 selects a VM 114 (e.g., from an application definition) in the deployment environment 112 and/or in the application 102 (block 504), and accesses a configuration of the selected VM 114 (block 506).

The agent installer 126 determines whether the configuration of the selected VM matches a policy rule (in the management policy) requiring an installation of an agent on the VM 114 (block 508). If the selected VM 114 has a primary workload designated in the policy, the agent installer 126 initiates installation of an agent 132 on the selected VM 114 (block 510). For example, the agent installer 126 may instruct the VM 114 to install the agent 132 and provide the agent 132 to be installed or provide a pointer (e.g., a URL or other location) to the agent 132 and/or an installation package for the agent 132.

During deployment of the agent(s) to the VM(s) 114 (in block 310), the example performance monitoring server 106 of FIG. 1 may present the example interface 1100 of FIG. 11 to display statuses of the VM(s) 114 during installation. In the example of FIG. 11, the example VM 1006 is in the process of installing an agent. After the agent(s) are installed at the VM(s) 114, the example performance monitoring server 106 may present the example interface 1200, in which the example VM 1006 has a status of an agent running (e.g., installed and running).

After initiating the installation of the agent 132 on the selected VM 114 (block 510), or if the configuration of the selected VM 114 does not match a policy rule requiring installation of the agent 132 (block 508), the example agent installer 126 determines whether there are additional VMs (block 512). If there are additional VMs (block 512), control returns to block 504 to select another VM 114. When there are no more VMs (block 512), the example instructions 500 end and the agent installer 126 passes control to the agent monitor 130 at block 312 of FIG. 3.

Figure 6:
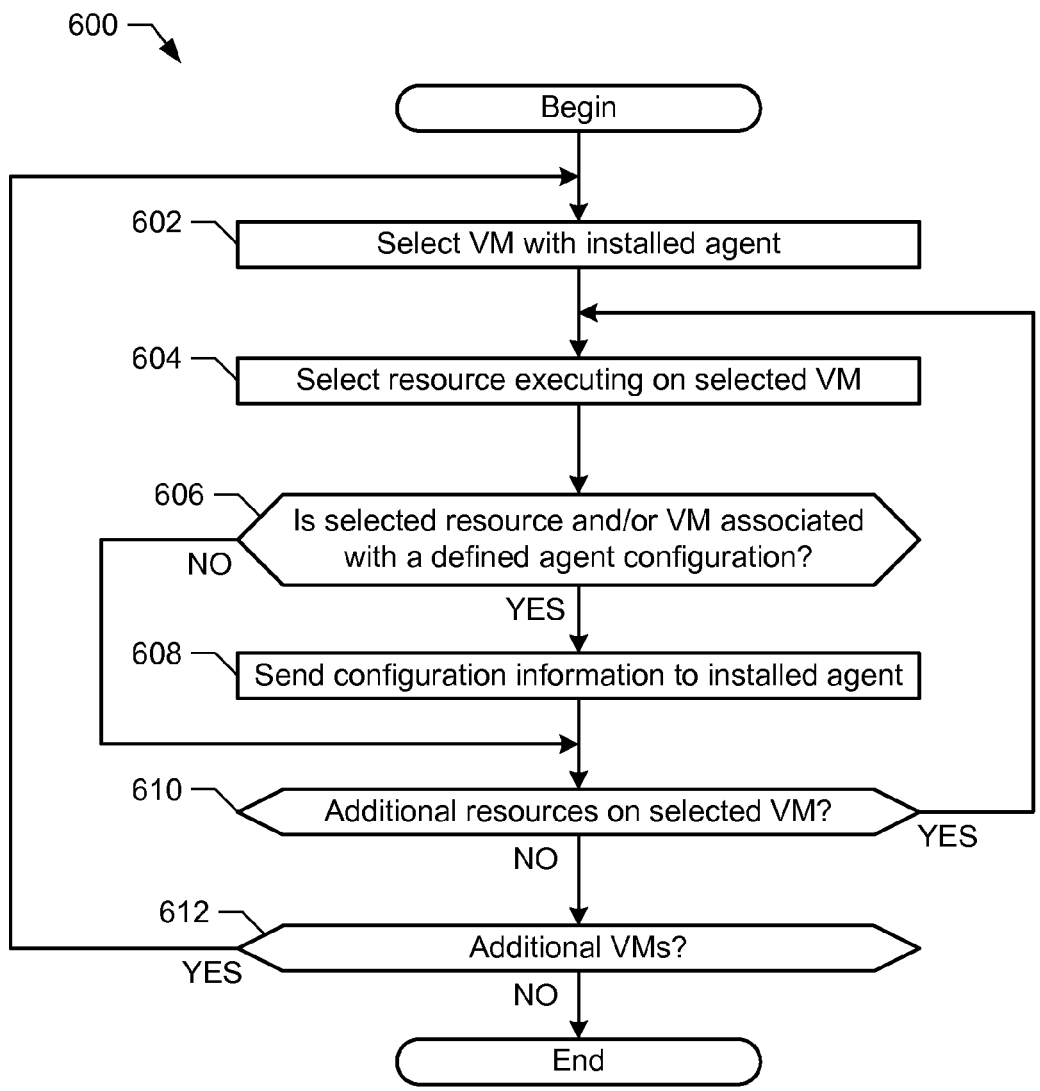
FIG. 6 is a flowchart representative of example machine readable instructions which may be executed to implement the example performance monitoring server of FIG. 1 to apply monitoring policies to resources on a VM.

FIG. 6 is a flowchart representative of example machine readable instructions 600 which may be executed to implement the example performance monitoring server 106 of FIG. 1 to apply monitoring policies to resources on a VM (e.g., the VMs 114 of FIG. 1).

The example agent monitor 130 of FIG. 1 selects a VM 114 that has an installed agent 132 (block 602). For example, the agent monitor 130 may select the VM 114 based on receiving a resource report from the agent 132 installed on the VM 114. The agent monitor 130 selects a resource executing on the selected VM 114 (block 604). The example agent monitor 130 may select the resource from one or more resources listed in the resource report. The example agent monitor 130 of FIG. 1 determines whether the selected resource and/or VM 114 are associated with a defined agent configuration (block 606). Example information or settings that may be configured in the agent 132 are illustrated in FIG. 9. The selected resource and/or VM 114 may be associated with a defined agent configuration in, for example, a rule defined in the application rules database 128. The example agent monitor 130 can therefore tailor agents (e.g., via installation of particular agents and/or configuration of agents) to perform monitoring of different types of VMs 114 and/or resources. In some examples, the agent monitor 130 may determine whether a configuration (e.g., the presence of a service or other configuration item) of the selected VM 114 matches one or more conditions specified in a policy rule (e.g., in the application rules database 128).

If the selected resource and/or VM 114 are associated with a defined agent configuration (block 606), the example agent monitor 130 sends configuration information to the installed agent 132 (block 608). The agent 132 configures itself using the configuration information. In some examples, the agent monitor 130 confirms that the agent 132 was correctly configured via a checksum or other method.

After sending the configuration information (block 608), or if the selected resource and/or VM 114 are not associated with a defined agent configuration (block 606), the example agent monitor 130 determines whether there are additional resources on the selected VM 114 (block 610). If there are additional resources on the selected VM 114 (block 610), control returns to block 604 to select another resource. When there are no more resources on the selected VM 114 (block 610), the example agent monitor 130 determines whether there are additional VMs 114 (block 612). If there are additional VMs 114 (block 612), control returns to block 602 to select another VM 114. When there are no more VMs to process (block 612), the example instructions 600 end and control returns to block 304 of FIG. 3 to continue monitoring and/or automatically configuring VMs in the application 102.

In some examples, after sending the configuration information to the agent (block 608), the agent monitor 130 may omit processing of further resources for the selected VM and pass control to block 612.

Figure 7:
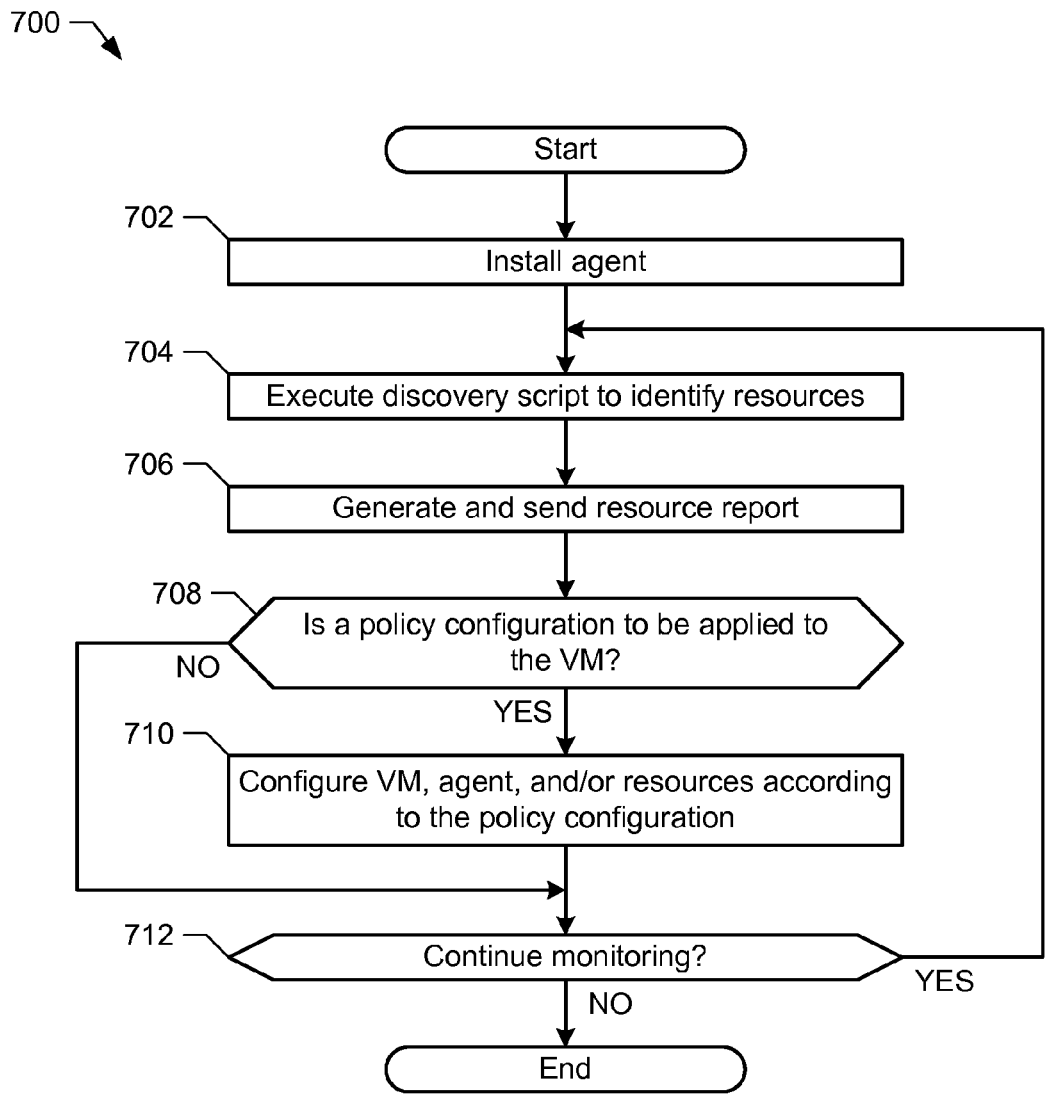
FIG. 7 is a flowchart representative of example machine readable instructions which may be executed to implement the example VMs of FIG. 1 to automatically monitor and/or configure the VMs using an agent.

FIG. 7 is a flowchart representative of example machine readable instructions 700 which may be executed to implement the example VMs 114 of FIG. 1 to automatically monitor and/or configure the VMs 114 using an agent (e.g., the agents 132 of FIG. 1). The example instructions 700 may be executed when the example performance monitoring server 106 deploys an agent 132 to the VM 114.

The example VM 114 installs a designated agent (e.g., a performance monitoring agent, the agent 132) (block 702). The example agent 132 executes a discovery script to identify resources executing on the VM 114 (block 704). For example, the agent 132 may identify any platform(s), server(s), and/or service(s) executing on the VM 114. In some examples, the agent 132 identifies resources having particular characteristics (e.g., resources having particular dependencies, resources associated with a particular application 102, etc.). Based on the discovered resources, the example agent 132 generates and sends a resource report (e.g., to the agent monitor 130) (block 706). The resource report includes information about the resources executing on the example VM 114. The resource report enables the example performance monitoring server 106 to present an interface such as the interface of FIG. 13 including the identified resources on a VM 114. The example performance monitoring server 106 generates and presents the interface of FIG. 13 for one or more VMs 114 based on resource report(s) received from the agent(s) 132 executing on the corresponding VMs 114.

The example agent 132 determines whether a policy configuration is to be applied to the VM 114 (block 708). For example, the agent 132 may monitor for communications and/or commands from the agent monitor 130 including agent configuration information, resource configuration information, and/or other configuration commands or data. If a policy configuration is to be applied (block 708), the agent 132 configures the VM 114, the resources executing on the VM 114 (e.g., the services 202, the guest OS 204, the servers 240, etc.), and/or the agent 132 according to the policy configuration (block 710). In some examples, configuring the agent 132 includes adding the VM 114 and/or the agent 132 to a designated monitoring group (e.g., a group of VMs 114 and/or agents 132 to be organized, monitored, and/or modified together based on one or more shared aspects). The example interface 1400 of FIG. 14 may be presented by the performance monitoring server 106 after adding the example resource 1302 to a monitoring group (e.g., based on a configuration applied to the VM 114, the resource 1302, and/or the agent 132).

After configuring the VM 114, the agent 132, and/or the resources (block 710), or if there is no policy configuration to be applied (block 708), the example agent 132 determines whether it is to continue monitoring the VM 114 (block 712). For example, the agent 132 may provide updates to the agent monitor 130 regarding the status of the VM 114 and/or resources executing on the VM 114. Additionally or alternatively, management policies may change, which can affect the VM 114 and/or the resources.

Figure 8:
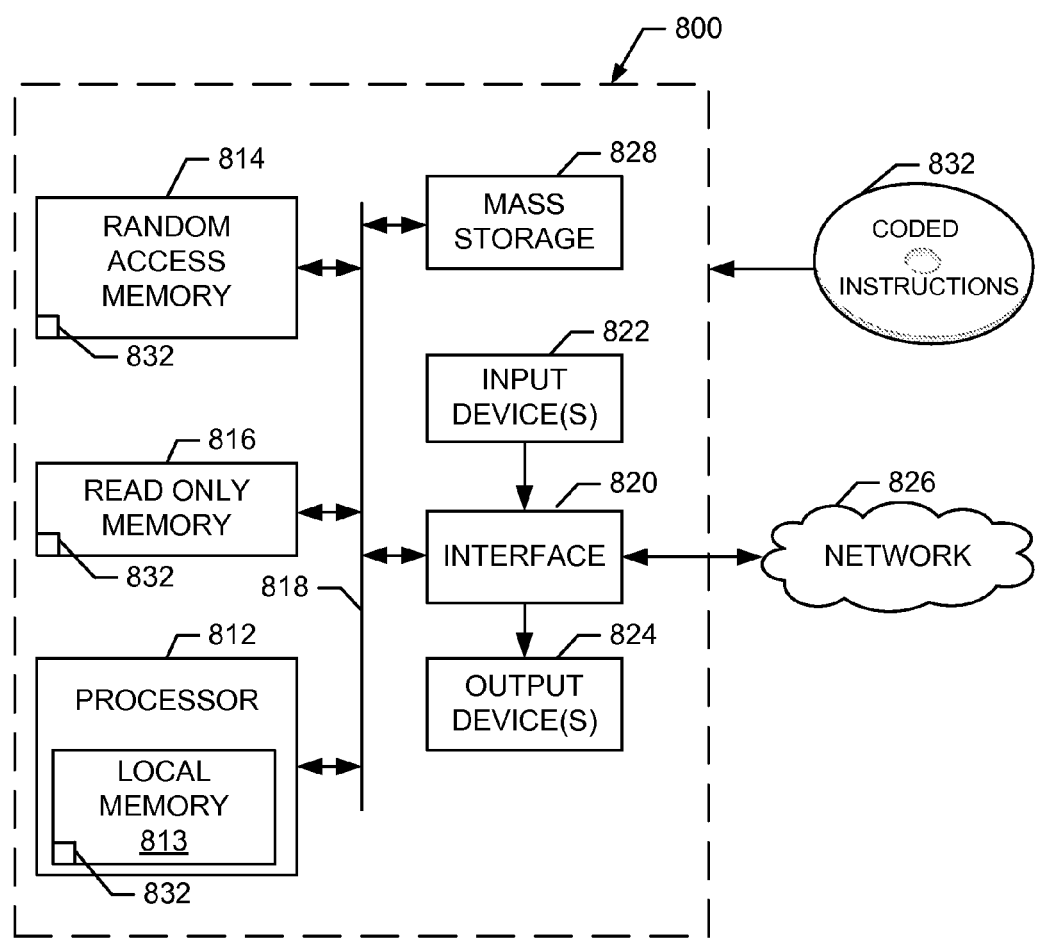
FIG. 8 is a block diagram of an example processor platform capable of executing the instructions of FIGS. 3, 4, 5, 6 and/or 7 to implement the system of FIG. 1.

FIG. 8 is a block diagram of an example processor platform 800 capable of executing the instructions of FIGS. 3, 4, 5, 6, and/or 7 to implement the performance monitoring server 106 and/or the virtual infrastructure navigator 108 of FIG. 1. The processor platform 800 can be, for example, a server, a personal computer, a mobile device (e.g., a cell phone, a smart phone, a tablet such as an iPad™), or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

The coded instructions 832 of FIGS. 3-7 may be stored in the mass storage device 828, in the volatile memory 814, in the non-volatile memory 816, and/or on a removable tangible computer readable storage medium such as a CD or DVD.

As mentioned above, example methods and apparatus disclosed herein facilitate the automatic monitoring of resources in cloud environments and/or the automatic updating of monitoring configurations. Example methods and apparatus enable accurate and efficient monitoring and/or analysis by automatically updating monitoring to reflect any changes to virtual machines, applications, and/or deployments.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method, comprising:
    identifying, by executing an instruction with a processor, a first virtual machine in a first application definition;
    determining, by executing an instruction with the processor, that the first virtual machine identifies a second virtual machine based on configuration information of the first virtual machine, the second virtual machine having an unknown agent status;
    comparing, by executing an instruction with the processor, the first application definition to a second application definition, the second application definition including the first virtual machine and the second virtual machine;
    in response to determining that the first application definition does not include the second virtual machine, determining, by executing an instruction with the processor, if a configuration of the second virtual machine matches a designated configuration;
    automatically installing an agent on the second virtual machine when the second virtual machine is identified as having the designated configuration;
    updating the unknown agent status of the second virtual machine to indicate that the installed agent is running; and
    based on a resource automatically identified by the agent associated with the second virtual machine, applying a monitoring policy to the second virtual machine, the monitoring policy to be executed by the agent.

2. A method as defined in claim 1, further including accessing a configuration item associated with the second virtual machine and comparing the configuration item of the second virtual machine to the designated configuration.

3. A method as defined in claim 1, wherein automatically identifying the resource associated with the second virtual machine includes obtaining a resource report from the agent, the resource report listing the resource.

4. A method as defined in claim 1, wherein applying the monitoring policy includes sending configuration information to the agent, the configuration information to configure the agent to implement the monitoring policy.

5. A method as defined in claim 4, wherein the configuration information includes at least one of a monitoring server address, an agent user name, an agent user password, an installation package location, an installation directory, an agent version, a configuration of a service, a configuration of a secure connection to a monitoring server, a performance agent server port, a performance agent port, or a configuration of unidirectional communication.

6. A method as defined in claim 1, further including determining whether a configuration of the resource matches a condition in the monitoring policy, the applying of the monitoring policy being based on the configuration of the resource matching the condition.

7. A method as defined in claim 1, wherein installing the agent on the second virtual machine includes instructing the second virtual machine to install the agent or providing a location of an installer for the agent to the second virtual machine.

8. A method as defined in claim 1, wherein identifying the second virtual machine includes analyzing firth virtual machine to identify at least one of a dependency associated with the second virtual machine, a node cluster including the second virtual machine, a port configuration of the first virtual machine identifying an address of the second virtual machine, or a virtual machine identifier of the second virtual machine.

9. A method as defined in claim 1, wherein applying the monitoring policy includes determining whether a presence of the resource on the second virtual machine matches a monitoring rule, the applying of the monitoring policy to the second virtual machine occurring based on the presence of the resource matching the monitoring rule.

10. A system, comprising:
    a service analyzer to:
        identify a first virtual machine in a first application definition; and
        determine that the first virtual machine identifies a second virtual machine based on configuration information of the first virtual machine, the second virtual machine having an unknown agent status;
    a virtual machine analyzer to:
        compare the first application definition to a second application definition, the second application definition including the first virtual machine and the second virtual machine; and in response to a determination that the first application definition does not include the second virtual machine, determine if a configuration of the second virtual machine matches a designated configuration;

an agent installer to install an agent on the second virtual machine based on the virtual machine analyzer identifying that the configuration of the second virtual machine matches a designated configuration, the unknown agent status of the second virtual machine updated to indicate that the installed agent is a running agent; and an agent monitor to automatically identify a resource associated with the virtual machine and, based on the resource, apply a monitoring policy to the virtual machine, the monitoring policy to be executed by the agent, at least one of the service analyzer, the virtual machine analyzer, the agent installer and the agent monitor implemented by a logic circuit.

11. A system as defined in claim 10, further including an application configuration database to store configuration items discovered by the virtual machine analyzer.

12. A system as defined in claim 10, further including an application rule database to store rules specifying a configuration of the agent based on the resource.

13. A system as defined in claim 12, wherein the agent monitor is to:
determine the configuration of the agent by comparing the resource to the rules stored in the application rule database; and
enforce a determined configuration at the agent based on the rules associated with the resource.

14. A system as defined in claim 10, wherein the agent installer is to:
access the configuration of the second virtual machine; and
compare the configuration of the second virtual machine to the designated configuration.

15. A system as defined in claim 10, wherein the agent monitor is to determine whether a configuration of the resource matches a condition in the monitoring policy, the agent monitor to apply the monitoring policy when the configuration of the resource matches the condition.

16. A system as defined in claim 10, wherein the resource includes at least one of an operating system executing on the second virtual machine, an application executing on the second virtual machine, or a service implemented using the second virtual machine.

17. A system as defined in claim 10, wherein the service analyzer is to identify the second virtual machine by analyzing the first virtual machine to identify at least one of a dependency associated with the second virtual machine, a node cluster including the second virtual machine, a port configuration of the first virtual machine identifying an address of the second virtual machine, or a virtual machine identifier of the second virtual machine.

18. A system as defined in claim 10, wherein the agent monitor is to determine whether the presence of the resource on the second virtual machine matches a monitoring rule, the agent monitor to apply the monitoring policy to the second virtual machine when the presence of the resource matches the monitoring rule.

19. A tangible computer readable storage medium comprising computer readable instructions which, when executed, cause a processor to at least:
identify a first virtual machine in a first application definition;
determine that the first virtual machine identifies a second virtual machine based on configuration information of the first virtual machine, the second virtual machine having an unknown agent status;
compare the first application definition to a second application definition, the second application definition including the first virtual machine and the second virtual machine;
determine if a configuration of the second virtual machine matches a designated configuration based on a determination that the first application definition does not include the second virtual machine;
instruct the second virtual machine to install an agent when the second virtual machine is identified as having a designated configuration;
update the unknown agent status of the second virtual machine to indicate that the installed agent is running; and
based on a resource automatically identified by the agent associated with the second virtual machine, apply a monitoring policy to the second virtual machine, the monitoring policy to be executed by the agent.

20. A storage medium as defined in claim 19, wherein the instructions further cause the processor to access a configuration item associated with the second virtual machine and compare the configuration item to the designated configuration.

21. A storage medium as defined in claim 19, wherein the instructions further cause the processor to identify the resource associated with the second virtual machine by obtaining a resource report from the agent, the resource report listing the resource.

22. A storage medium as defined in claim 19, wherein the instructions further cause the processor to apply the monitoring policy by sending configuration information to the agent, the configuration information to configure the agent to implement the monitoring policy.

23. A storage medium as defined in claim 19, wherein the instructions further cause the processor to determine whether a configuration of the resource matches a condition in the monitoring policy, the applying of the monitoring policy being based on the configuration of the resource matching the condition.

24. A storage medium as defined in claim 19, wherein the instructions further cause the processor to install the agent on the second virtual machine by instructing the second virtual machine to install the agent or providing a location of an installer for the agent to the second virtual machine.

25. A storage medium as defined in claim 19, wherein the instructions further cause the processor to identify the second virtual machine by analyzing first virtual machine to identify at least one of a dependency associated with the second virtual machine, a node cluster including the second virtual machine, a port configuration of the first virtual machine identifying an address of the second virtual machine, or a virtual machine identifier of the second virtual machine.

26. A storage medium as defined in claim 19, wherein the instructions further cause the processor to apply the monitoring policy by determining whether the presence of the resource on the second virtual machine matches a monitoring rule, the applying of the monitoring policy to the second virtual machine occurring when the presence of the resource matches the monitoring rule.

* * * * *